US008439554B2

(12) United States Patent
Kaas

(10) Patent No.: US 8,439,554 B2
(45) Date of Patent: May 14, 2013

(54) WHISK ATTACHMENT

(76) Inventor: Randy Kaas, Phoenix, AZ (US)

( * ) Notice: Subject to any disclaimer, the term of this patent is extended or adjusted under 35 U.S.C. 154(b) by 717 days.

(21) Appl. No.: 12/721,075

(22) Filed: Mar. 10, 2010

(65) Prior Publication Data

US 2010/0165785 A1    Jul. 1, 2010

Related U.S. Application Data

(63) Continuation-in-part of application No. 11/457,282, filed on Jul. 13, 2006, now abandoned.

(51) Int. Cl.
*B01F 7/08* (2006.01)

(52) U.S. Cl.
USPC .......................... 366/325.6; 366/343

(58) Field of Classification Search .................. 366/129, 366/325.6, 343
See application file for complete search history.

(56) References Cited

U.S. PATENT DOCUMENTS

| | | | | |
|---|---|---|---|---|
| 375,274 | A | | 12/1882 | Dodson |
| 504,112 | A | * | 8/1893 | Paine .......................... 416/70 R |
| 506,636 | A | * | 10/1893 | De Witt Harvey ............. 416/173 |
| 527,022 | A | * | 10/1894 | Parrish ........................... 366/332 |
| 632,780 | A | * | 9/1899 | Crepeau ......................... 366/256 |
| 647,341 | A | * | 4/1900 | Tutt .................................. 416/76 |
| D34,098 | S | * | 2/1901 | Fell ............................... D7/380 |
| 678,586 | A | * | 7/1901 | Preston et al. ................. 15/141.1 |
| 771,088 | A | * | 9/1904 | Paley et al. ....................... 416/72 |
| 781,917 | A | * | 2/1905 | Smith .......................... 416/70 R |
| 846,661 | A | * | 3/1907 | Godward ........................ 416/76 |
| 1,140,341 | A | * | 5/1915 | Johnston et al. ................. 416/75 |
| 1,170,358 | A | * | 2/1916 | Sweeting ........................ 241/301 |
| 1,171,054 | A | * | 2/1916 | Keppeler ........................ 366/343 |
| 1,287,741 | A | * | 12/1918 | Pinkney ..................... 416/214 R |
| 1,579,382 | A | * | 4/1926 | Mitchell ........................ 15/141.1 |
| 1,627,314 | A | * | 5/1927 | Boynton ......................... 416/76 |
| 1,627,315 | A | * | 5/1927 | Boynton ......................... 416/76 |
| 1,722,187 | A | * | 7/1929 | Wetzel ....................... 416/214 R |
| 1,783,437 | A | | 12/1930 | Laib |
| 1,786,603 | A | * | 12/1930 | Dawson .................... 416/227 R |
| 1,960,089 | A | * | 5/1934 | Rabb ............................. 74/89.45 |
| 2,278,398 | A | * | 3/1942 | Wittmann ...................... 366/343 |
| 2,397,011 | A | * | 3/1946 | Jensen ....................... 416/204 R |
| 2,442,326 | A | * | 5/1948 | Pribil ........................... 416/70 R |
| 2,639,904 | A | | 5/1953 | McMaster et al. |
| 2,670,938 | A | * | 3/1954 | Wittmann ...................... 366/343 |
| 2,694,880 | A | * | 11/1954 | Artese et al. .............. 15/104.001 |
| 2,798,702 | A | * | 7/1957 | Fjellstedt ........................ 416/72 |
| 2,804,819 | A | * | 9/1957 | Whealton ........................ 99/441 |
| 2,906,510 | A | * | 9/1959 | Harris ............................. 416/72 |
| 3,132,849 | A | * | 5/1964 | Kritikson ....................... 366/282 |
| 4,380,192 | A | * | 4/1983 | Doren ............................. 99/441 |
| 5,037,210 | A | * | 8/1991 | Bliss .............................. 366/279 |
| 5,354,129 | A | * | 10/1994 | Yowell .......................... 366/343 |

(Continued)

*Primary Examiner* — Tony G Soohoo
(74) *Attorney, Agent, or Firm* — McNees Wallace & Nurick LLC

(57) ABSTRACT

A whisk attachment for use with an automated mixer is disclosed. The whisk attachment includes a coupling member, at least two coil members, and a brace. The first coil member has first and second ends attached to the coupling member to define the first coil member having a substantially parabolic shape. The second coil member also has first and second ends attached to the coupling member to define the second coil member also having a substantially parabolic shape. The brace is attached to each of the first and second coil members to resist relative movement of the first coil member with respect to the second coil member.

20 Claims, 7 Drawing Sheets

U.S. PATENT DOCUMENTS

| | | | | |
|---|---|---|---|---|
| 5,482,367 A * | 1/1996 | Khan et al. | | 366/129 |
| 5,725,305 A * | 3/1998 | Delbor | | 366/129 |
| D406,216 S * | 3/1999 | Renner | | D7/690 |
| 5,908,241 A * | 6/1999 | Bliss et al. | | 366/129 |
| 6,200,015 B1 * | 3/2001 | Gartz et al. | | 366/256 |
| 6,257,752 B1 | 7/2001 | Browne | | |
| D452,111 S * | 12/2001 | Lane | | D7/376 |
| 6,558,035 B2 * | 5/2003 | Lane | | 366/129 |
| 6,701,827 B1 * | 3/2004 | Longbrake | | 99/441 |
| D489,583 S * | 5/2004 | Cheung | | D7/690 |
| D490,667 S * | 6/2004 | Cheung | | D7/690 |
| D492,165 S * | 6/2004 | Cheung | | D7/690 |
| D493,330 S * | 7/2004 | Lane | | D7/395 |
| 6,796,705 B1 * | 9/2004 | Khubani | | 366/197 |
| 6,921,194 B2 * | 7/2005 | Weber | | 366/325.6 |
| 7,044,631 B2 * | 5/2006 | Settele | | 366/129 |
| 7,354,189 B2 * | 4/2008 | Cheung | | 366/129 |
| 2002/0075752 A1 * | 6/2002 | Lane | | 366/129 |
| 2003/0177914 A1 * | 9/2003 | Schub | | 99/348 |
| 2004/0151061 A1 * | 8/2004 | Cheung | | 366/129 |
| 2006/0262638 A1 * | 11/2006 | Cheung | | 366/129 |
| 2007/0014187 A1 * | 1/2007 | Kaas | | 366/325.6 |

* cited by examiner

WHISK ATTACHMENT

RELATED APPLICATION

This application is a continuation in part of U.S. application Ser. No. 11/457,282, filed on Jul. 13, 2006, now abandoned. This application claims priority to U.S. application Ser. No. 11/547,282, filed on Jul. 13, 2006.

FIELD OF THE DISCLOSURE

The present disclosure is directed to kitchen appliance accessories and more particularly to a whisk attachment for automated mixers.

BACKGROUND OF THE DISCLOSURE

When cooking or baking, ingredients are often stirred with an automated mixer. These mixers are equipped to use various interchangeable attachments that are often particular to specific types of ingredients or stirring processes. For example, flat beaters are typically used for heavy cookie dough batter, dough hooks are typically used for mixing and kneading yeast bread dough, and wire beaters (whisks) are often used to add air to whipped mixes such as whipping cream, eggs, and egg whites. Conventional whisks for automated mixers have smooth, vertical tines that are unsupported except at the attachment points of the tines to the base where the attachment connects to the mixer. This can produce inconsistent and undesirable results that can have a negative impact on presentation, which is an important aspect of providing an appealing, appetizing food product.

There is a need for a whisk attachment for automated mixers that can quickly and consistently provide superior results.

SUMMARY OF THE DISCLOSURE

According to an exemplary embodiment, a whisk attachment for a mixer is disclosed that comprises a coupling member, a first coil member, a second coil member and a brace. The first and second coil members each have a first end and a second end and the first and second ends of the coil members are attached to the coupling member at coil member end points, the coil members having a substantially parabolic portion. The brace is attached to the substantially parabolic portion of each of the first and second coil members. The brace restricts relative movement of the first coil member with respect to the second coil member. At least the first coil member is tineless.

According to another exemplary embodiment, the brace is a cross-brace that is attached to each of the first and second coil members, the brace being separately attached to two different locations of the first coil member on opposite sides of a first coil member vertex and the brace also being separately attached to two different locations of the second coil member on opposite sides of a second coil member vertex.

In yet another exemplary embodiment, a method for mixing a food product is disclosed comprising providing an automated stand mixer having a whisk attachment consistent with exemplary embodiments discussed herein and further providing a bowl, and a food product to be whipped. The method further includes whipping the food product in the bowl with the automated mixer using the whisk attachment.

An advantage of certain exemplary embodiments described herein is that the time for whipping food products is reduced, while also achieving consistent mixing results.

Another advantage is that the coil members of the whisk attachment according exemplary embodiments has a greater lineal surface area than uncoiled vertical tines found in conventional whisk attachments and further stirs the in both a horizontal and vertical direction, introduce greater amounts of air into food products during whipping.

Yet another advantage is that the whisk attachment according exemplary embodiments includes a brace that stabilizes the shape of the whisk attachment even at high speeds, reducing undesirable non-uniform movement of the coil members that can lead to poor results.

Other features and advantages of the present disclosure will be apparent from the following more detailed description of exemplary embodiments, taken in conjunction with the accompanying drawings which illustrate, by way of example, the principles of the disclosure.

BRIEF DESCRIPTION OF THE DRAWINGS

Where like parts appear in more than one drawing, it has been attempted to use like reference numerals for clarity.

DETAILED DESCRIPTION OF EXEMPLARY EMBODIMENTS

Figure 1:
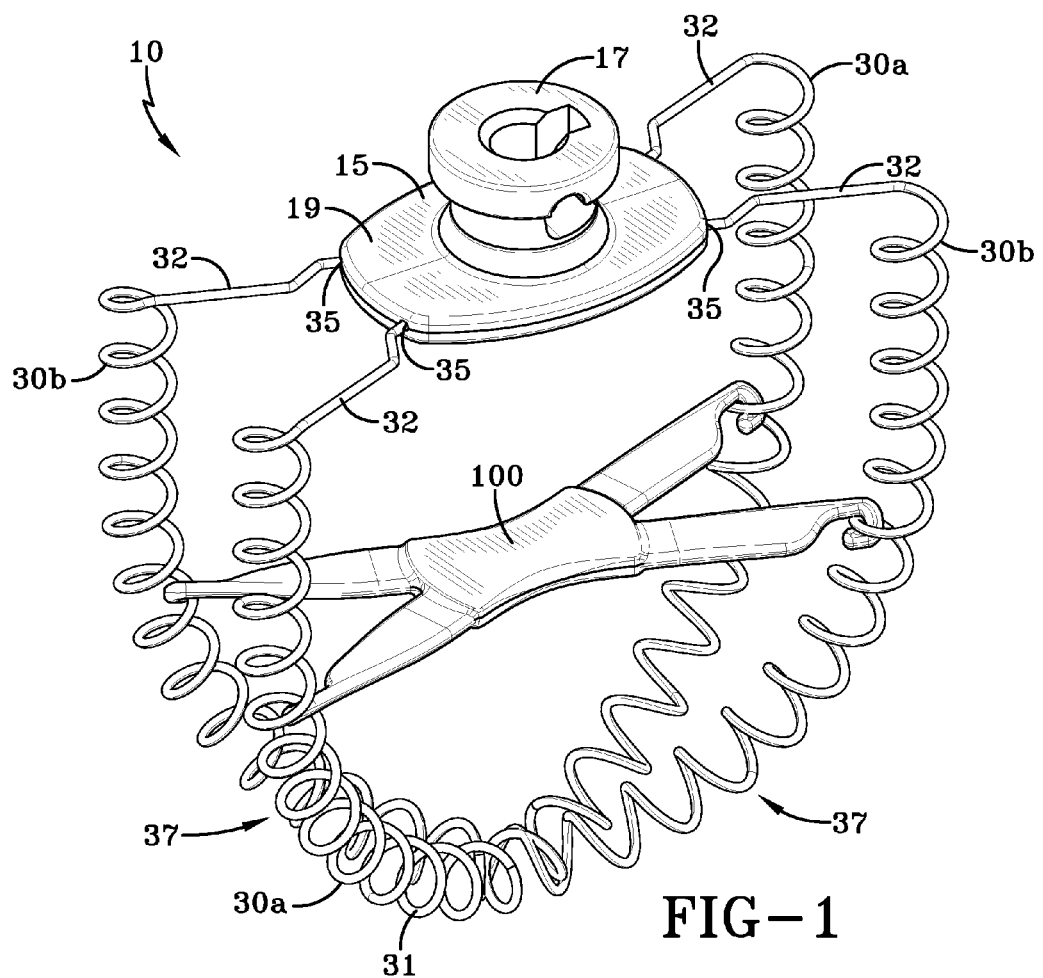
FIG. 1 illustrates a whisk attachment in accordance with an exemplary embodiment of the disclosure.

Referring now to FIG. 1, a whisk attachment 10 is shown for use with an automated mixer. The whisk attachment 10 includes a coupling member 15, a plurality of coil members 30, and a brace 100, such as the illustrated cross-brace. Unlike prior whisks that mix eggs and other food products only in the vertical direction, according to exemplary embodiments, the use of coil members 30 increases the lineal surface area available for whipping and also result in mixing liquids in both a vertical and a horizontal plane, increasing the amount of air whipped into those liquids using the whisk attachment and providing a stiffer and longer lasting product.

Figure 7:
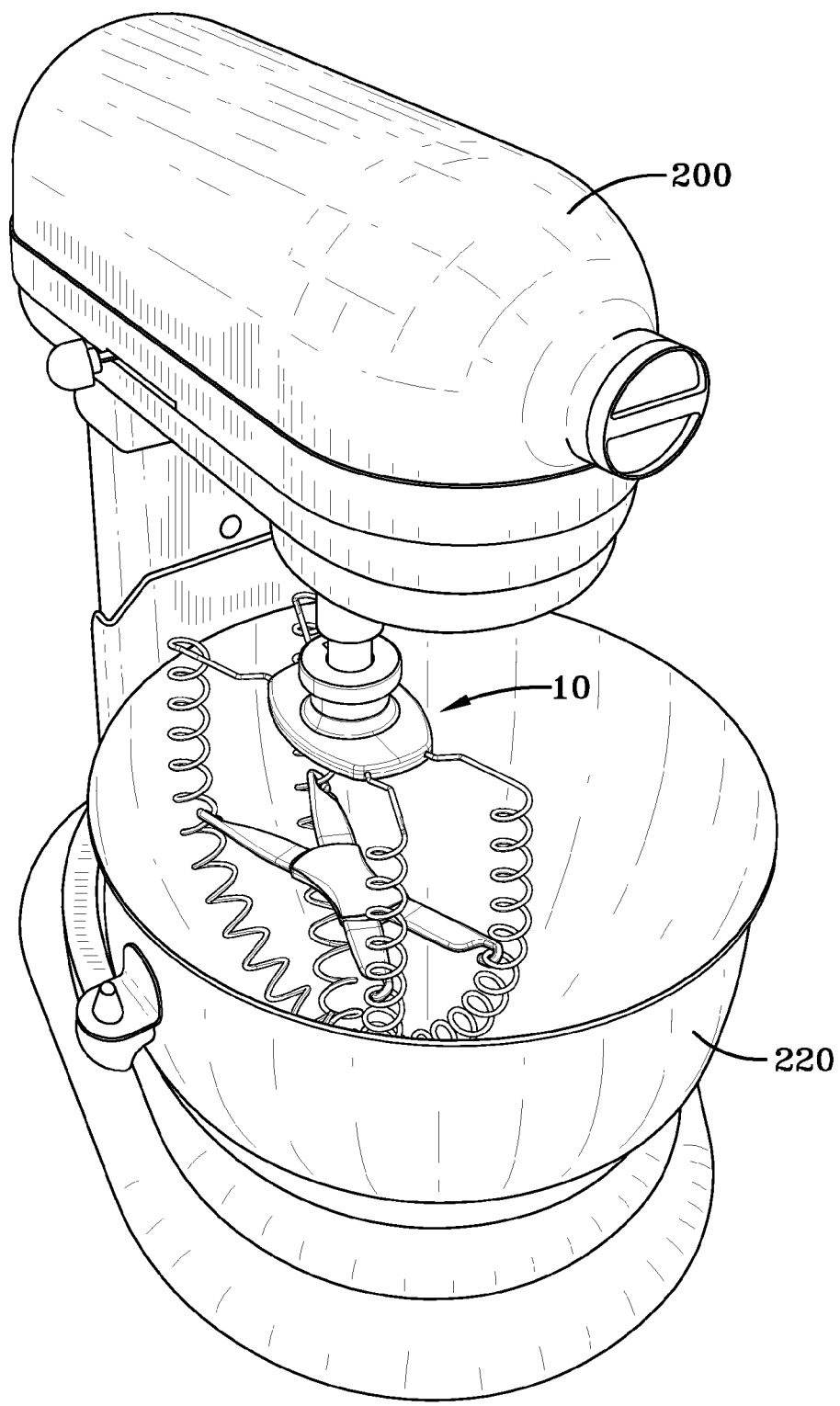
FIG. 7 illustrates an automated mixer having the whisk attachment of FIG. 1.

The coupling member 15 allows the whisk attachment 10 to be removably coupled to an automated mixer 200 (FIG. 7). In this manner, the whisk attachment 10 can be used interchangeably with other attachments for the automated mixer 200 and/or be removed for cleaning after a mixing operation. For purposes of the present application, it will be appreciated that the terms "mixing" and "mixing operation" refer to the use of an automated mixer to stir a food product and does not necessarily require that more than a single ingredient is being acted upon by the whisk attachment 10. In most cases the automated mixer 200 will be an electric mixer, although the mixer may be automated by any suitable power source.

The particular way in which the coupling member 15 is adapted to couple with an automated mixer may depend on the manner in which the automated mixer is designed to permit attachments to be used interchangeably. In one embodiment, the coupling member 15 includes a collar 17 that engages the automated mixer and a base 19 attached to the collar 17 that acts as a support, as well as an attachment point for the coil members 30. The collar 17 may be keyed or otherwise adapted to ensure proper coupling with the automated mixer in accordance with familiar principles for attaching mixer attachments to automated mixers.

As illustrated in FIG. 1, each of a first and second coil member 30a, 30b is attached to the coupling member 15. The first coil member 30a is attached to the coupling member 15 at each of the coil member's end points 35; the first coil member 30a has a substantially parabolic portion 37. Likewise, the second coil member 30b is also attached to the coupling member 15 at each of its end points 35 and has a substantially parabolic portion 37. By "substantially parabolic" is meant that a portion of the coil members 30 have a generally curved, bowl-like shape although the coil members need not meet any particular mathematical definition. Although illustrated with two coil members 30a, 30b, it will be appreciated that exemplary embodiments may include any additional number of coil members for use in a whisking operation.

The coil members 30 may include a stem portion 32 at each end that extends outwardly away from the coupling member 15 at the coil member endpoint 35 and may be used to separate the coupling member 15 from the substantially parabolic portion 37 of the coil members 30. The stem portion 32 may be coiled, or uncoiled as shown in FIG. 1. The stem portion 32 may extend from the coupling member 15 in a linear or curved fashion from the coil member endpoint 35; it may also extend horizontally or be inclined in a positive or negative direction from the horizontal. The length and orientation of the stem portions 32 contribute to the particular shape and dimensions of the parabolic portion 37 of the coil member 30, and ultimately to that of whisk attachment 10.

The coil members 30 cross over or through one another. In one embodiment, each coil member extends downward to a vertex 31, which may be a common location as shown in FIG. 1, such that the first coil member 30a and the second coil member 30b cross through one another at that location.

In the illustrated embodiment, the coil members 30 are tineless; that is, the coil members 30 are self-supporting and do not include any support member passing through the coil members 30 along their length to define the coil member's shape. The presence of tines may have the tendency to introduce undesirable irregular movement within the whisk attachment 10 during use that can result in weeping or other undesirable attributes in the food product that the whisk attachment 10 is being used to create.

Figure 5:
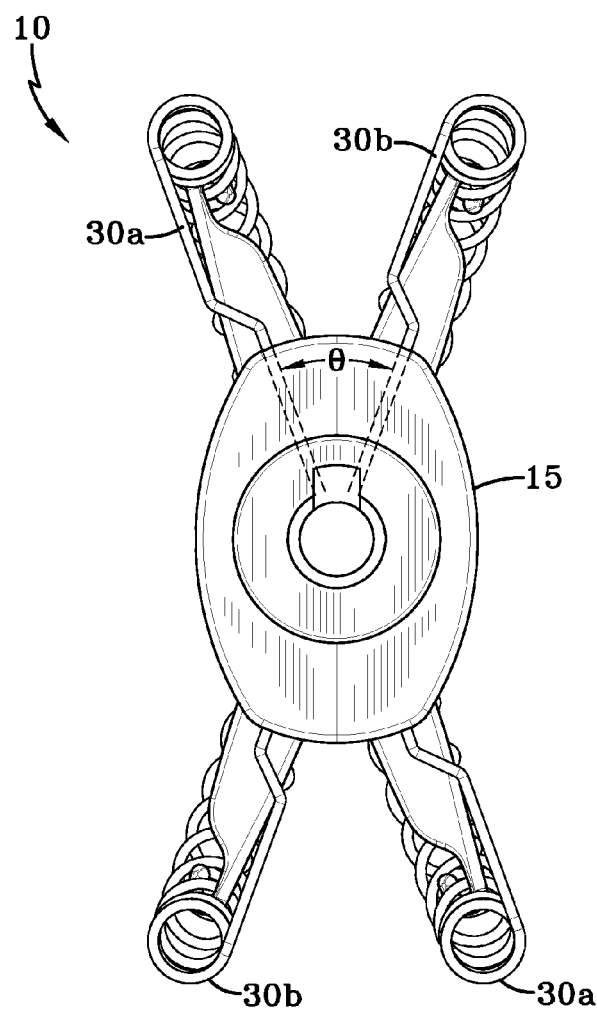
FIGS. 5 and 6 illustrate top and bottom views, respectively, of the whisk attachment of FIG. 1.
Figure 6:
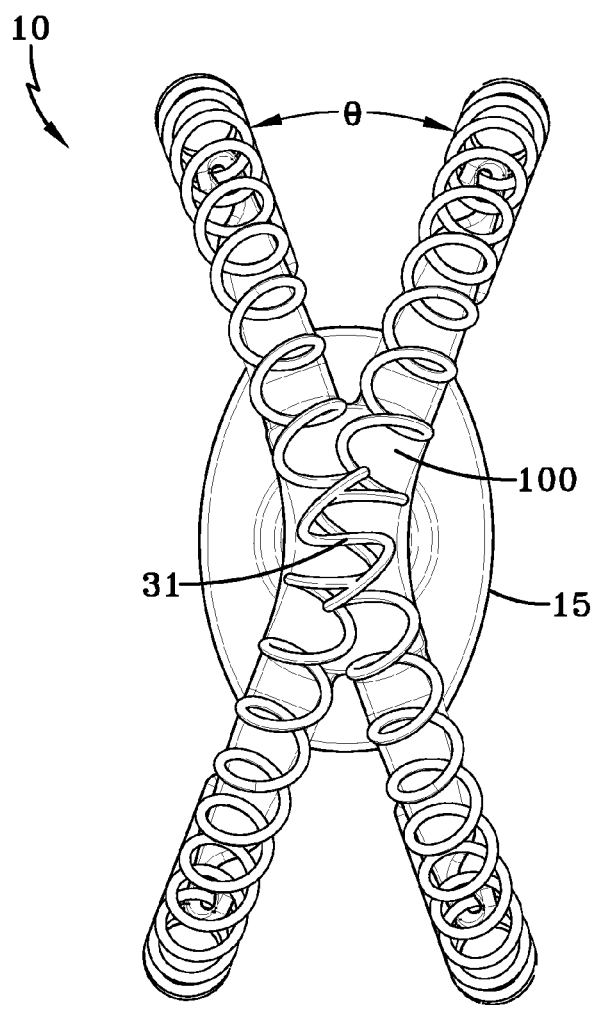

As best seen in FIG. 5, adjacent coil members 30a, 30b extend away from the coupling member 15 to define an angle θ between them that can be any angle between about 15 and 90 degrees. In one embodiment, θ is an angle between about 30 and 50 degrees.

The coil members 30, including any stem portions 32, can be manufactured from any suitable material, such as metal or polymer, by way of example only. In one embodiment, the coil members 30 are of a resilient metallic material, such as stainless steel for example, that is capable of retaining its coiled shape when used in mixing operations and being subjected to resistance from the food material being mixed. The material used and the corresponding thickness (i.e., wire gauge) selected for manufacturing the coil member may depend on the sizes of the whisk attachment and corresponding automated mixer and bowl, as well as whether the whisk attachment is being manufactured primarily for commercial or personal use. As those of ordinary skill will readily appreciate, while whisk attachments are most often used in situations in which liquids are being mixed, the volume and viscosity of those liquids will have an impact on the resistance forces experienced by the whisk attachment 10. In some embodiments, metallic coil members 30 may be coated with food-grade silicone or other material which can assist to ease cleaning or may lower resistance of the coil members 30 with respect to the food being whisked, thereby increasing mixing speed.

In one embodiment, the coil members 30 have a pitch of about 0.7 turns per inch, although the pitch may be greater or less than that amount. Too small of a pitch may provide insufficient mixing in two planes, while too great of a pitch decreases the space between coils where the mixing occurs and can further increase the weight of the attachment, thereby decreasing the mixing speed.

Figure 2:
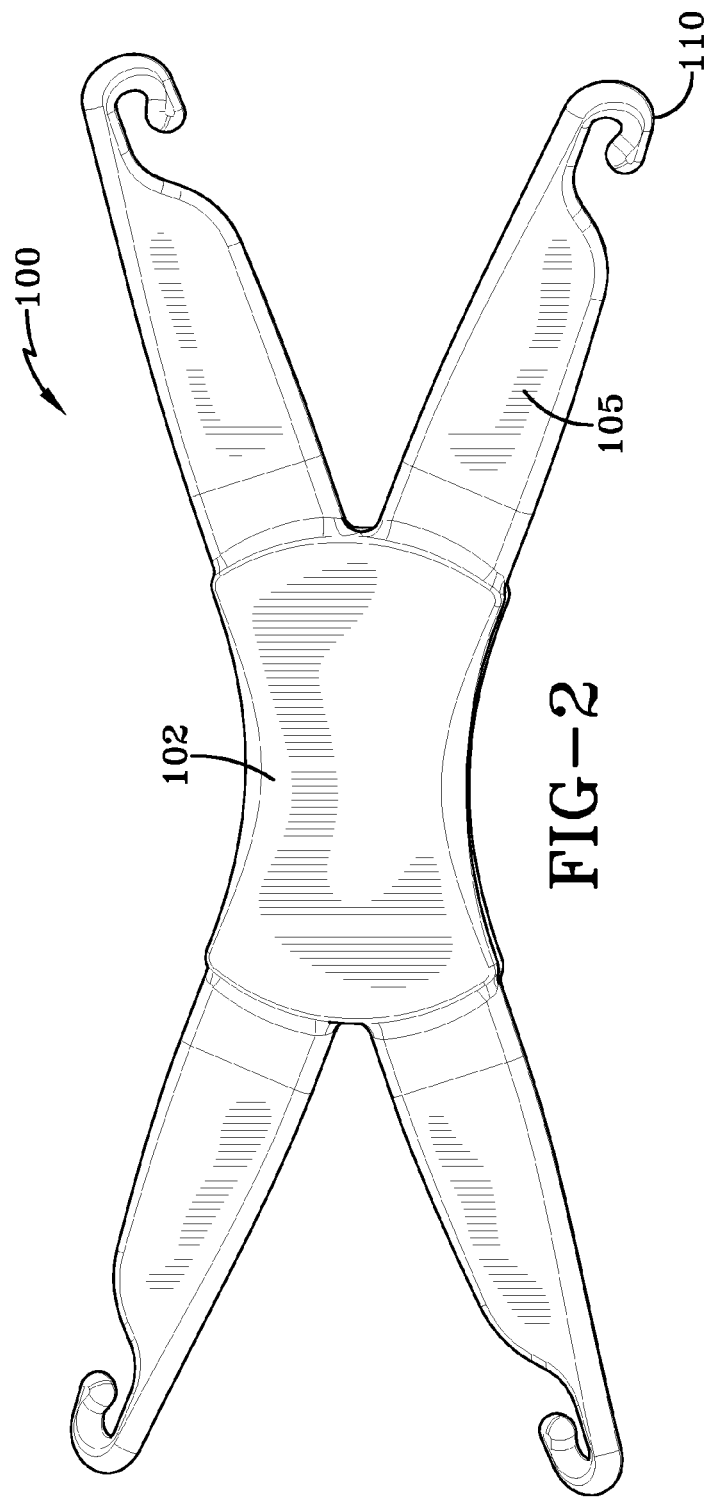
FIG. 2 illustrates a brace for use with a whisk attachment in accordance with an exemplary embodiment of the disclosure.
Figure 3:
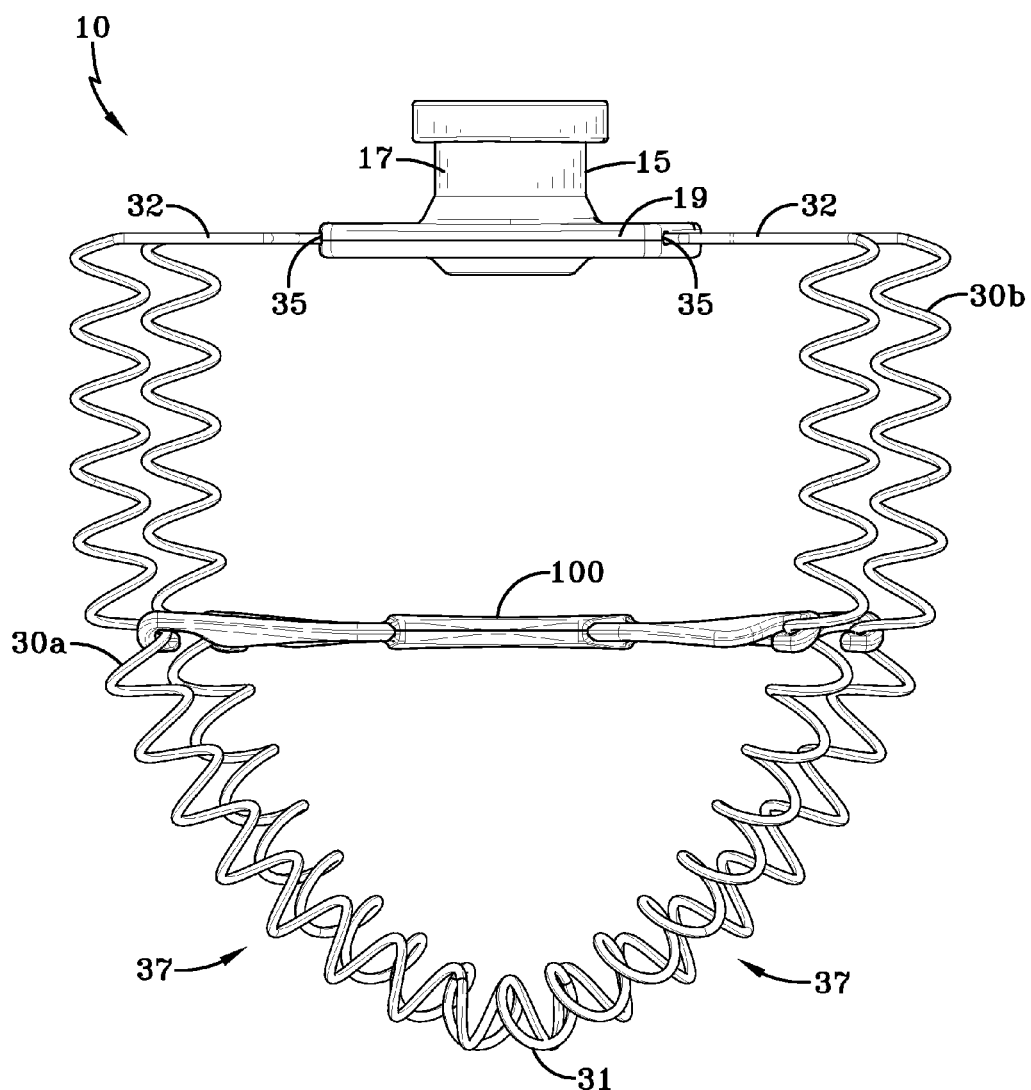
FIGS. 3 and 4 illustrate side views of the whisk attachment of FIG. 1.
Figure 4:
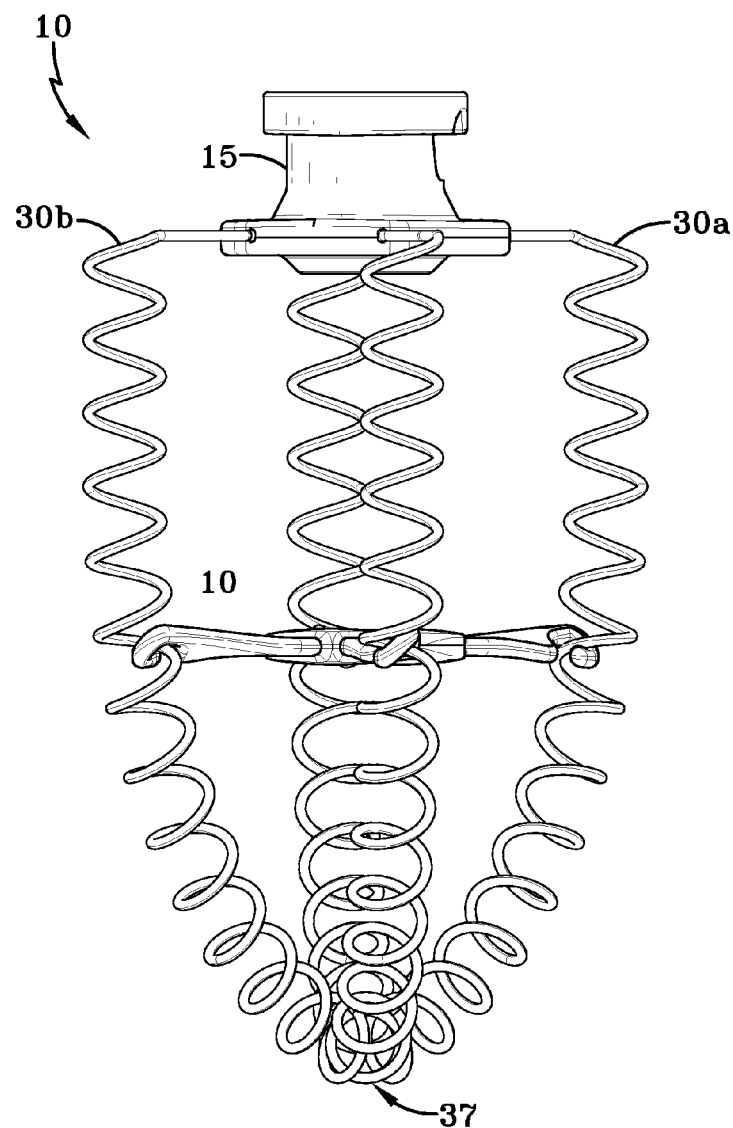

The coil members 30 are stabilized by the brace 100, which restricts relative movement of the first coil member 30a with respect to the second coil member 30b, so that the whisk attachment 10 substantially maintains its overall shape, even when the whisk attachment is in use and is subjected to rotational and torsional forces applied by the automated mixer and to resistance forces of the food being mixed. As better seen in FIG. 2, the brace 100 includes a plurality of arms 105, each arm 105 having a hook 110 or other attachment member for grasping or otherwise attaching to the coil members 30. In one embodiment, two arms 105 and corresponding hooks 110 are associated with each coil member 30a, 30b, such that the brace 100 attaches to that coil member 30a, 30b on each side of the vertex 31 (best seen in FIG. 3). While the brace 100 is not limited to a particular number of arms 105, embodiments in which the brace 100 has exactly two arms 105 attached to each coil member 30 on opposite side of the vertex 31 may be sufficient to achieve the desired result without forming a whisk attachment that is too rigid for its intended use.

The brace 100 can be sized to be placed at any point within the whisk attachment 10 to achieve its intended function and stabilize the coil members 30 in their relative positions to one another and thus maintain the overall shape of the whisk attachment 10 during use. The brace 100 is generally attached somewhere between one-third and two-thirds the overall vertical distance measured from the member endpoints 35 to the bottom of the attachment 10, which is typically the vertex 31 of the first and/or second coil members 30a, 30b; in one embodiment, best seen in FIG. 3, the brace 100 is attached about halfway between the member endpoints 35 and the vertex 31.

In some embodiments, the brace 100 can be removed for more thorough cleaning of it and the coil members 30 after use by slipping the coil members 30 from the hooks 110 or other attachment member at the end of the brace arms 105. The brace 100 can be re-attached at its initial position or it can be attached at a different position. If attached at a different position, because the length of the brace 100 may be greater or less than the distance between the natural shape of the coil members 30, the placement of the brace at a different location may have the effect of modifying the overall shape of the whisk attachment 10.

Whisk attachments in accordance with exemplary embodiments can be used for both home and commercial purposes. Preferably, the whisk attachment can be used in conjunction with a planetary automated mixer 200, which includes many popular stand mixers manufactured by Kitchen Aid for personal use, as well as commercial stand mixers such as those manufactured by Hobart, by way of example only.

Whether or not the whisk attachment 10 is used in conjunction with a planetary mixer, the whisk attachment 10 is sized such that during mixing, it sweeps the interior volume of a bowl 220 (FIG. 7) in which the mixing occurs by approaching but preferably minimizing contact with the sides of the bowl by avoiding contact between the sides of the bowl and the entire length of the coil members, although some contact may still occur. While prior efforts in the field have explored the ability of various mixer attachments to scrape food from the side of the bowl as part of the mixing process, the inventor has determined that whisk attachments in accordance with exemplary embodiments have demonstrated that superior results in whipped products can be achieved by minimizing contact with the side of the bowl during the mixing operation. It has been determined that this contact can cause vibrations and other irregular movement of the coil members 30 that may be deleterious to the results sought to be achieved in the food product being whisked, particularly when eggs, egg whites, and cream or combinations of these ingredients are present during mixing.

The invention has been reduced to practice in accordance with the embodiment illustrated in FIGS. 1-6. The whisk attachment 10 was used for whipping egg whites using a standard, household planetary automated stand mixer, similar to that illustrated in FIG. 7. The egg whites whipped with the whisk attachment in accordance with the exemplary embodiment of the invention yielded significantly stiffer peaks than those which are achieved using conventional whisk attachments having only vertical tines and no brace. It was also observed that the egg whites whipped with the whisk attachment in accordance with the exemplary embodiment of the invention did not start weeping until long after what is observed when using conventional whisk attachments.

Thus, while the foregoing specification illustrates and describes exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A whisk attachment for an automated stand mixer comprising:
    a coupling member adapted to be removably coupled to an automated stand mixer;
    a first coil member having a first end and a second end, the first and second ends of the first coil member attached to the coupling member at first coil member end points, the first coil member having a substantially parabolic portion;
    a second coil member having a first end and a second end, the first and second ends of the second coil member attached to the coupling member at second coil member end points, the second coil member having a substantially parabolic portion; and
    a brace attached to the substantially parabolic portion of each of the first and second coil members, wherein the brace restricts relative movement of the first coil member with respect to the second coil member,
    wherein at least the first coil member is tineless.

2. The whisk attachment of claim 1, wherein the brace is attached to two separate locations of the substantially parabolic portion of the first coil member and two separate locations of the substantially parabolic portion of the second coil member.

3. The whisk attachment of claim 1, wherein the first coil member crosses through the second coil member at a common vertex.

4. The whisk attachment of claim 1, wherein the brace is positioned between about one-third and about two-thirds the distance between the coupling member and a vertex of the first coil member.

5. The whisk attachment of claim 1, wherein the brace is positioned between about halfway between the coupling member and a vertex of the first coil member.

6. The whisk attachment of claim 1, wherein the brace comprises a plurality or arms having hooks adapted to removably attach to the first and second coil members.

7. The whisk attachment of claim 1, wherein all of the coil members are tineless.

8. The whisk attachment of claim 1, wherein the whisk attachment has exactly two coil members.

9. The whisk attachment of claim 1, wherein adjacent coil members extend away from the coupling member to define an angle between them in the range of about fifteen to ninety degrees.

10. The whisk attachment of claim 1, wherein adjacent coil members extend away from the coupling member to define an angle between them in the range of about thirty to fifty degrees.

11. The whisk attachment of claim 1, wherein at least the first coil member has a pitch of about 0.7 turns per inch.

12. The whisk attachment of claim 1, wherein the first coil member includes stem portions that extend outwardly away from the coupling member at the first coil member endpoints, the substantially parabolic portion positioned between the stem portions.

13. A method of mixing food product comprising:
    providing an automated stand mixer having a whisk attachment according to claim 1, a bowl, and a food product to be whipped; and
    whipping the food product in the bowl with the automated stand mixer using the whisk attachment.

14. The method of claim 13 wherein the food product is selected from the group consisting of eggs, egg whites, cream and combinations thereof.

15. The method of claim 13, wherein the step of mixing includes the step of mixing the food product in the bowl with a planetary automated stand mixer using the whisk attachment, wherein the whisk attachment is sized to sweep the interior volume of the bowl without striking the sides of the bowl.

16. A whisk attachment for a mixer comprising:
    a coupling member;
    a first coil member having a first end and a second end, the first and second ends of the first coil member each attached to the coupling member by stem portions at first coil member endpoints, the first coil member further having a substantially parabolic portion between the stem portions;
    a second coil member having a first end and a second end, the first and second ends of the second coil member each attached to the coupling member by stem portions at second coil member endpoints, the second coil member further having a substantially parabolic portion between the stem portions; the first coil member crossing the second coil member; and
    a cross-brace attached to each of the first and second coil members, the brace being separately attached to two different locations of the first coil member on opposite sides of a first coil member vertex and the brace also being separately attached to two different locations of the second coil member on opposite sides of a second coil member vertex, wherein the brace restricts relative movement of the first coil member with respect to the second coil member and wherein at least one of the coil members is tineless.

17. The whisk attachment of claim 16, wherein each of the first and second coil members are tineless.

18. The whisk attachment of claim 16, wherein the first coil member crossing the second coil member comprises the first coil member crossing through the second coil member.

19. The whisk attachment of claim 16, wherein adjacent coil members extend away from the coupling member to define an angle between them in the range of about thirty to fifty degrees.

20. The whisk attachment of claim 16, wherein at least the first coil member has a pitch of about 0.7 turns per inch.

\* \* \* \* \*